United States Patent [19]

Alfredsson et al.

[11] Patent Number: 4,693,579

[45] Date of Patent: Sep. 15, 1987

[54] ARRANGEMENT FOR WINDING CAMERAS

[75] Inventors: Alf I. Alfredsson, Sävedalen; Kjell A. Persson, Skene, both of Sweden

[73] Assignee: Victor Hasselblad AB, Gothenburg, Sweden

[21] Appl. No.: 784,554

[22] Filed: Oct. 4, 1985

[30] Foreign Application Priority Data

Oct. 8, 1984 [SE] Sweden .............................. 8405019

[51] Int. Cl.[4] .............................................. G03B 1/12
[52] U.S. Cl. .................................. 354/173.1; 354/209; 354/214
[58] Field of Search ................ 354/171, 173.1, 173.11, 354/209, 212, 214

[56] References Cited

U.S. PATENT DOCUMENTS 4,006,489 2/1977 Aizawa et al. .................... 354/173.1
4,460,265 7/1984 Mashimo et al. ................. 354/173.1
4,522,477 6/1985 Iwashita et al. .................. 354/173.1

Primary Examiner—A. A. Mathews

[57] ABSTRACT

The present invention relates to an arrangement equipped with a motor and a transmission device for the winding of those cameras provided with a winding shaft which is accessible from the outside and which is designed to be rotated until its movement is arrested by a first locking device in the form of a tensioning lock, which after exposure of the film, will once more release the winding shaft. Included in the transmission device is a spring which is tensioned by the motor whilst the camera is being tensioned and which, once tensioning of the camera is complete, is kept under tension under the effect of both the tensioning lock of the camera and a second locking device contained in the arrangement in the form of a rewinding lock. The arrangement also includes a switch which, once tensioning is complete, that is to say with the tensioning shaft in the position in which it is locked against further rotation by the tensioning lock, will interrupt the power supply to the motor. Once the camera has been exposed, that is to say when the tensioning lock releases, the winding shaft will be caused to rotate by the force of the spring, when the switch will be made to close the supply circuit to the motor.

3 Claims, 5 Drawing Figures

ARRANGEMENT FOR WINDING CAMERAS

The present invention relates to an arrangement for winding cameras provided with a tensioning shaft accessible from the outside, so arranged as to be rotated for the purpose of tensioning the camera until its tensioning motion is arrested by a first locking device so arranged, once the exposure sequence of the camera is complete, as to release the tensioning shaft once more so as to permit the camera to be tensioned again, irrespective of any turning moment acting upon the tensioning shaft, said arrangement including an electric motor and a transmission device for the transfer of torque from the motor to the tensioning shaft.

The camera market contains many different models which offer as an accessory a so-called winder for the automatic tensioning or winding of the camera and for advancing the film. These contain an electric motor and power source.

Once exposure has taken place, and when the camera requires to be tensioned ready for the next picture, the circuit between the power source and the motor must be made, that is to say a switch of some kind must be closed. Since exposure takes place inside the camera and the circuit requires to be made in the winder, some form of signal transmission must take place between the camera and the winder. One solution involves positioning the aforementioned switch inside the camera and providing the camera and the winder with a contact pin for the current. Another solution involves having some form of mechanical arm which extends from the camera and into the winder, or vice versa, and which indicates or senses that exposure has taken place and that the camera requires to be winded. The camera must accordingly be provided with special detailed features to enable a winder connected to the camera to be controlled.

Many cameras, however, exhibit a feature which is not normally taken into account when it is necessary to 'signal' the status of the camera to the winder; the nature of this feature is, in fact, that the winding shaft of the cameras is prevented from further rotation when the camera is fully wound, and that, once the exposure sequence is complete, the lock will release and the shaft will be free to rotate so as to permit new winding. For the purposes of sensing this it is possible in accordance with the invention to apply a loading to the winding shaft in the form of a torque applied in the direction of winding on condition that the camera will operate with such a moment applied. The Hasselblad 2000 FCW is a camera of this kind.

The invention thus proposes the utilization of the aforementioned feature in certain cameras, and is characterized for this purpose in that the transmission device constitutes a power transmission element in a sprung driving device installed between a primary drive shaft and a secondary drive shaft connected to the winding shaft, said driving device being so arranged, under the effect of the drive from the motor and the transmission device and by interacting with the first locking device, as to be itself tensioned as the camera is tensioned, a first switch so arranged by interacting with the secondary shaft as to interrupt the power supply to the motor at certain first angular positions of the secondary shaft corresponding to the status of the camera once it has been tensioned and is ready for use, and a second locking device so arranged as to interact with locking notches on the primary shaft situated at such other angular positions in relation to the first angular positions as to limit the return motion of the primary shaft attributable to the driving device attempting to release its tension when the motor is switched off, and in that the constituent component parts of the arrangement are so dimensioned that the energy stored as a result of the effect of the locking device in the sprung driving device is sufficient, when the camera is actuated, to cause the released winding shaft connected to the secondary shaft to rotate from an angular position corresponding to an interrupted power supply to the motor so that it is ready for the start of a new tensioning sequence.

The opportunity is provided by this invention for connecting a winder to a camera without integral motor switches or mechanical sensor arms with only minor modifications such as, for example, the introduction of a holder for the winder.

In a particularly advantageous embodiment of the invention the first switch is executed in the form of a two-position change-over switch, which in one position supplies the motor with current and in the other position is connected in parallel with the motor via a second switch, which is closed by sensing the position of the second locking device once the winding cycle by the winder is complete.

In this embodiment of the invention the winder is especially gentle on the camera to which it is connected, since the winder mechanism is arrested at the end of the tensioning cycle by shorting out the motor instead of the lock inside the camera.

In order to permit automatic switching on of the winder so that no external switch is required, the winder in one embodiment is provided with a third switch which is connected in series with the motor and which senses when the winder is connected to a camera through mechanical contact with a device situated on the camera, appropriately a belt button.

Another embodiment, which is specific to the Hasselblad 2000 FCW camera, is equipped with a plunger for operating the double-exposure button of the camera. This provides a technical solution to the problem of the automatic tensioning of the first shutter, if this has been released by a magazine change.

The invention is described below in greater detail and is explained in conjunction with the Figures contained in the accompanying drawings, of which FIG. 1 is a diagrammatic representation of a winder without a cover and with parts of the frame omitted for the sake of clarity, and FIG. 2 is an electrical circuit in the winder.

Figure 1:
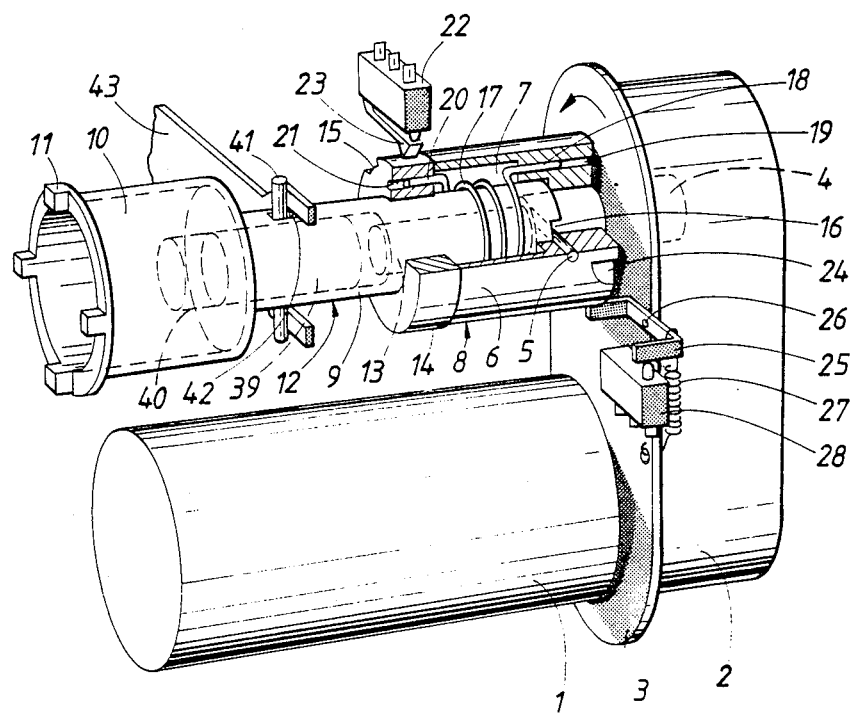

It will be appreciated from the Figures that a winder in accordance with the invention contains a motor 1, a gearbox 2 connected to the motor, and an end-plate 3. Connected to the output from the gearbox 2 is a first shaft 4 which is rigidly connected via a pin 5 to a coaxial, essentially cylindrical body, this being a cylinder 6, which is in turn provided with a coaxial, cylindrical cavity 7 open at its end facing away from the gearbox.

The first shaft 4 with the cylinder 6 is referred to below as the primary shaft 8. Into the cavity 7 of the primary shaft 8 there extends coaxially one end of a second shaft 9, the other end of which is fitted with a hollow connecting crown 10 having teeth 11 which engage with a connecting device (not shown) situated on the winding shaft of the camera and corresponding to the connecting crown 10.

The second shaft 9 with the connecting crown 10 is referred to below as the secondary shaft 12.

The first shaft 4 is executed with a guide pin 13 which extends into a cavity in the end of the second shaft 9 situated inside the cylindrical body 6 for holding the secondary shaft.

In the immediate vicinity of the entrance opening in the cylinder 6 for the second shaft 9, the secondary shaft is fitted with a permanent, coaxial ring 14 having a recess 15 in its outer surface. The cylinder 6 and the ring 14 are sectioned in the Figure so as to provide increased clarity, although in reality they are rotationally symmetrical.

The second shaft 9 is provided at the inner end of the end situated inside the body 6 with two recesses 16, through which the pin 5 extends (only one side is shown). Because the width of the recesses 16 is greater than the thickness of the pin 5, the secondary shaft 12 and the primary shaft 8 are free to rotate in relation to one another by a certain amount determined by the width of the slots 16.

Between the primary shaft 8 and the secondary shaft 12 there is connected a coil spring 17 located inside the cavity 7. One end 18 of the spring 17 is located in a hole 19 in the cylinder 6, and its other end 20 is located in a hole 21 in the ring 14.

The direction of rotation may differ, depending on the model of camera for which the winder is intended, although in the case indicated in the drawing the winder is illustrated in such a way that the primary shaft 8 and the secondary shaft 12 will rotate during the winding sequence in the direction indicated by the arrow in the drawing. The spring 17 is pre-tensioned in such a way that it will attempt to cause the secondary shaft 12 to rotate in the direction of the arrow in relation to the primary shaft 8, within the clearance provided for the pin 5 in the recesses 16.

Arranged next to the ring 14 is a first microswitch 22, the actual breaker arm 23 of which is in contact with the surface of the ring 14. The microswitch 22 is shown freely suspended for the sake of clarity, although in reality it is attached to the chassis (not shown). The expression microswitch is used in this context to denote the type of microswitch which is used as a change-over switch.

At a certain angle of rotation of the secondary shaft 12 the recess 15 will be situated directly in line with the point of contact of the breaker arm 23 with the ring 14. The depth of the recess 15 and the change-over points for the microswitch 22 have been selected in such a way that changing-over of the switch will occur when the breaker arm 23 drops into or rises out of the recess 15.

The surface of the cylindrical body 6 is provided at its end situated at the end-plate 3 with a notch 24 which has a square step at its edge facing in the direction of rotation, but which slopes at the opposite edge.

Against the surface of the cylinder 6 and interacting with that part which contains the notch 24 there rests one end of a lever arm 25 which is supported by means of a rivet 26 on the end-plate 3. The other end of the lever arm 25 interacts with a spring 27 which attempts to hold said one end of the lever arm in contact with the surface of the cylindrical body 6, and with a second microswitch 28 which, when said end is caused by the effect of the spring 27 during the rotation of the primary shaft 8 to adopt a position in the notch 24, is caused by the other end of the arm 25 to change-over from the open to the closed position. The arm 25 also functions as a rewinding lock for the primary shaft 8 by interacting with the square edge of the notch 24.

The mode of operation of the winder is explained below in relation to FIG. 2, which shows a basic circuit diagram for the power supply to the winder motor. The symbols + and − are used in the Figure to indicate a power source which in practice consists of a number of batteries or accumulators (not shown) situated inside the winder in a container.

The diagram also shows a change-over switch 29 which, in the example illustrated, interacts with a belt fastener positioned on the camera in such a way that, when the winder is attached to the camera, the change-over switch will be caused by the belt fastener on the camera to close the circuit in the manner illustrated in the diagram, and to break the circuit when the winder is removed.

Figure 3:
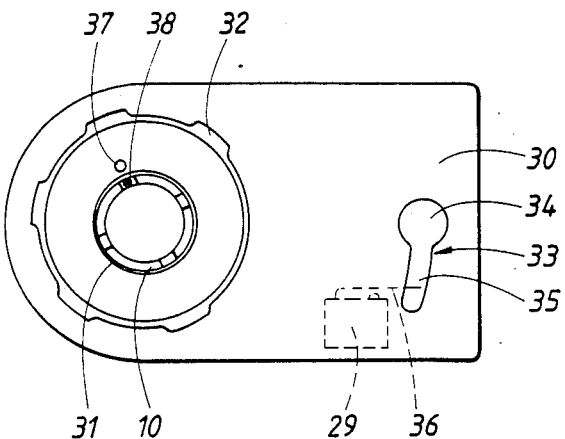
FIG. 3 is a diagrammatic view of the connection of the winder to the camera.

Illustrated in diagrammatic form in FIG. 3 is the manner in which the change-over switch 29 functions. An integral end-plate 30 of the winder is provided with an opening 31 through which the winding shaft (not shown) of the camera is connected to the connecting crown 10 when the winder is attached to the camera. Around the opening 31 is a bayonet mounting ring 32 which interacts with a corresponding mounting ring (not shown) on the camera in order to secure the winder.

Also present in the end-wall 30 is an almost 'keyhole-shaped' opening 33 which, when the winder is attached to the camera, accommodates the head of a belt fastener situated on the camera. The head of the belt fastener passes for this purpose through the 'wider' part 34 of the opening 33, and a turning motion effected in order to lock the mounting rings together will cause the belt fastener to run in the track 35 of the opening 33, which describes an arc with its centre of rotation coaxial with the bayonet mounting. Immediately before the belt fastener reaches the end of the groove 35, which subsequently coincides with the bayonet mounting, and with it the winder, reaching their locked position, the fastener comes up against the breaker arm 36 of the change-over switch 29, which changes-over its circuit in conjunction with the last part of the turning motion from the position shown in the Figure by means of a broken line to the position shown by a solid line, in so doing closing its section of the power supply circuit to the motor in accordance with FIG. 2.

Present on the end-plate 30 near the edge of the opening 31 is an index mark 37, with a corresponding index mark 38 being present on the connecting crown 10. These index marks 37 and 38 must be directly in line with each other when attaching the winder to a camera, and the connecting crown 10 will then engage with the winding shaft of the camera.

Figure 2:
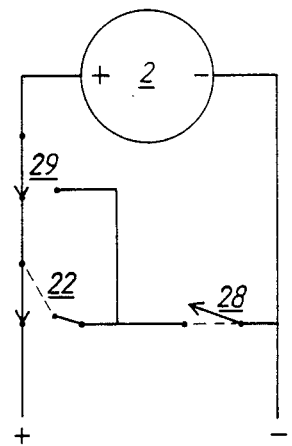

When the winder is not attached to a camera the change-over switch 29 will be in the position indicated by a broken line in FIG. 2. If, for one reason or another, the index marks of the winder are not in line with one another, this situation must be corrected before the winder is attached to a camera by rotating the secondary shaft 12 clockwise, since the notch 24 together with the locking arm 25 provides an appropriate stop in the correct position. The arm 25 could be damaged, however, if rotation were to take place at high speed, although since the change-over switch 29 is connected to the microswitch 28, and since this is closed at the same time as the locking arm 25 drops into the notch 24, the motor will be effectively braked by shorting and the load on the arm 25 will be light.

During the turning motion imparted by the winder in order to lock the bayonet mounting, the spring 17 will be tensioned because the secondary shaft 12 will be unable to accompany the turning motion as it is connected to the winding shaft of the camera which, if the camera has been tensioned, will be locked against advancing, and since the arm 25, with the secondary and primary shafts in this position, will, be interacting with the notch 24, prevent the primary shaft 8 from rotating 'in the wrong direction'.

Thus, as soon as a change takes place in the relative angle of rotation between the secondary shaft 12 and the actual winder, to the chassis of which the microswitch 22 is attached, the breaker arm 23 will descend into the matching recess 15, when the microswitch 22 will change-over to the position indicated by a broken line in FIG. 2, immediately before the switch 29 adopts the position shown in FIG. 2. In the event of the camera not being tensioned, the winding shaft of the camera will instead accompany the turning motion, and the breaker arm 23 of the microswitch 22 will remain in its 'depressed' position, that is to say with the switch 22 in the position indicated by a solid line in FIG. 2, for which reason, when the winder reaches the angle of rotation at which the microswitch 29 changes-over to the position shown in FIG. 2, the motor will start and will continue to run until the microswitch 22 breaks the circuit when the arm 23 reaches the recess 15, that is to say when the winding shaft of the camera reaches a lock against further winding and a complete winding cycle has been executed.

During a single, complete winding cycle, the torque required in order to rotate the winding shaft in a camera with standard equipment, that is to say a camera with a lens and a loaded magazine, is so great that the spring 17 will be wound through the majority or all of the angle permitted by the clearance around the pin 5. What this means is that, when the contact surface of the breaker arm 23 with the ring 14 reaches the recess 15, the end of the arm 25 in contact with the cylinder 6 will reach the notch 24 and will drop down into it more or less simultaneously. In conjunction with this the microswitch 27 will change-over to the position indicated by a broken line in FIG. 2, and since the microswitch 22 will change-over simultaneously to its position indicated by a broken line in FIG. 2, the motor will be shorted as a result. Since, as has already been mentioned, the shorting of an electric motor offers a highly effective means of braking the motor, this in turn means that the rotating parts of the winder will be braked once the winding cycle is complete, which is most significant, as the winding shaft of the camera and the internal mechanism of the camera would otherwise have to absorb the torque required to arrest the entire winding mechanism of the winder.

If the winder is adapted to a camera body without a lens and magazine, winding will normally take place so easily that the spring 17 will be esentially untensioned within the clearance around the pin 5. The rotational speed of the motor will be relatively high in view of the low resistance. What this means is that, when the camera is tensioned and ready for use, that is to say when the microswitch 22 changes-over to the position indicated by the broken line in FIG. 2 as a result of contact being made with the recess 15, in so doing causing the power supply to the motor to be interrupted, the motor and the power transmission mechanism will operate at such a speed that their impulse moment will be sufficient to turn the primary shaft 8 further so that the arm 25 will engage with the notch 24 and the motor will finally be braked by shorting via the switch 28. For this purpose the spring 17 will not only have achieved the desired tensioning, but will also have acted as a damping device on coming up against the lock on the winding shaft of the camera.

Once the tensioned camera has been released by pressure applied to the release button, and once a picture has been exposed, the lock on the winding shaft will release. This will cause the release of the force in the spring 17 which was tensioned within the clearance for the pin 5, and the winding shaft will be caused to rotate over a distance sufficient for the arm 23 of the microswitch 22 to leave the recess 15 and for the microswitch 22 to adopt the position indicated by a solid line in FIG. 2, that is to say the motor will start and the winder will execute a new winding cycle.

The camera which the winder described above is intended to serve, the Hasselblad 2000 FCW, incorporates a mechanism to permit the tensioning of the camera without advancing the film or winding-on the first curtain of the shutter, which is normally released by removing the magazine in order to exclude the possibility of damage through mechanical effects. This mechanism is activated by pressing a button, the double-exposure button, which is situated at the centre of the tensioning shaft. The lock on the tensioning shaft is thus released in this way. In the event of a change of magazine having taken place, the first curtain will have been released by the removal of the first magazine, and the first curtain must first be wound back when the second magazine is attached before the next exposure can take place. The manner in which this is achieved in an ordinary 2000 FC is for said button to be depressed using one finger, and for the camera to be tensioned with the help of a crank handle situated on the window shaft. This function, i.e. the tensioning of the first curtain once it has been released during a magazine change, is, of course, desirable as an automatic function in a winder. For this purpose the winder in accordance with the invention is constructed in accordance with the design details contained in FIGS. 4 and 5.

Figure 4:
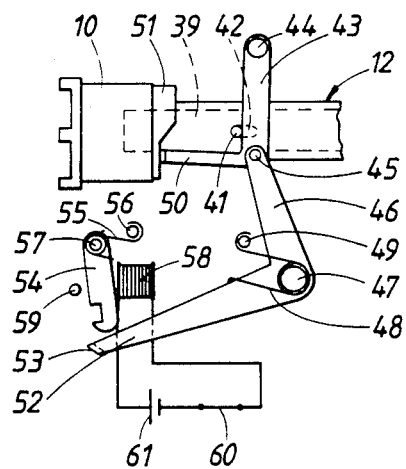
FIGS. 4 and 5 show a system of pivoting levers for a special additional function of the winder for tensioning the camera without advancing the film.
Figure 5:
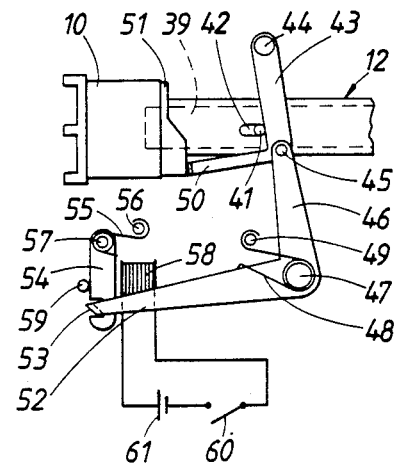

In order to be able to influence the double-exposure button (not shown) mechanically, the winder is provided with a plunger 39 situated inside a cavity inside the secondary shaft 12, coaxial with it, and with one of its ends 40 situated essentially at the 'bottom' of the winding crown 10. A pin 41 passes straight through the plunger and through slots 42 (only one of which is shown in the Figure) produced in the shaft 9 and facing one another. The plunger 39 is capable, as may be appreciated from FIGS. 4 and 5, of being displaced coaxially by a certain amount depending on the pin 41 and the slots 42, and when the winder is installed on the camera this amount will correspond to what is necessary for the plunger to be capable of actuating the double-exposure button or of leaving it unactuated. The mechanism for controlling the plunger contains a driving arm 43, one end of which is pivotally mounted on a first journal 44. (A variant of the arm 43 appears in FIG. 1). The arm 43 can be swung into contact with the pin 41. One end of a cranked arm 46 is attached via a guide pin 45 to the other end of the arm 43. The arm 46 is free to pivot about a second journal 47 and is pre-tensioned by means of a spring 48, which rests against a pin 49, in such a way that it will attempt to cause the arm 43 to move via the guide pin 45 in the direction of the winding crown, when the arm 43 causes the end 40 of the plunger 39 to move via the pin 41 outwards into the winding crown 10. If the winder is attached to a camera, the plunger will thus depress the double-exposure button and will activate the mechanism for winding-on without advancing the film. Since this mechanism is normally required to be at rest, that is to say the plunger 39 is required to be in its inner position, a system of pivoting levers has been built into the mechanism. The arm 43 is provided with a support 50 which rests against an inner bearing surface 51 on the winding crown 10. The bearing surface 51 is so executed as to exhibit a cam which, during the rotation associated with the winding-on of a camera, causes the arm 43 to be displaced via the support 50 and away from the winding crown 10, leaving the plunger 39 with its pin 41 free to move in the slots 42. It is possible in this way for the plunger to be moved back into its inner position by the button on the winding shaft of the camera as winding takes place. The cranked arm 46 connected to the arm 43 via the pivot 45 is provided at its other end 52 with a hook 53. As the bearing surface 51 is moved by the arm 43, the arm 46 is also caused via the pivot 45 to rotate about its journal 47, and the end 52 with the hook 53 is caused to click into engagement over a locking hook 54 in accordance with what is shown in FIGS. 4 and 5.

The locking hook 54 is pre-tensioned by means of a spring 55, which is retained by a stop pin 56 and which attempts to cause the locking hook 54 to rotate about its journal 57 and away from an electrical attracting magnet 58 against a stop 59. The arm 46, the stop 59 and the locking hook 54 fit together in such a way that the arm 46, under the turning effect applied indirectly by the bearing surface 51 via the arm 43 as the spring 55 is compressed, will slide over the hook of the locking hook 54 and will be prevented from returning when the cam on the bearing surface 51 moves away from the support 50. The mechanism is now set ready for use. When tensioning of the camera is to take place, for instance for the purpose of tensioning the first curtain in connection with a magazine change, a circuit symbolized in FIGS. 4 and 5 by a switch 60 and a power source 61 will be made, the magnet 58 will attract, the locking hook 54 will be drawn against the effect of the spring 55 towards the magnet, the arm 46 will be released, and the spring 48 will cause the plunger 39 via the pivot 45, the arm 43 and the pin 41 to depress the double-exposure button. When the lock on the tensioning shaft is reeased in this way, the spring 17 in the winder will cause the secondary shaft to rotate, the microswitch 22 will close the circuit to the motor, and a tensioning cycle will begin, during which the camera will be tensioned and the catching. mechanism will be re-set via the bearing surface 51.

In practice the switch 60 is built into the magazine mounting of the camera and senses mechanically in a previously disclosed fashion when a magazine is removed or attached by being switched on or off. When a magazine is attached, a previously disclosed electronic circuit of some kind (not shown) will sense the switching off of the switch and will create an electrical impulse which is transmitted at contacts between the camera and the winder to the latter and causes the actuation of the magnet 58. In order to produce a low current in the contact, the winder contains certain electronics of a previously disclosed nature, for example a Darlington circuit (not shown), which uses the voltage from the motor batteries to pass a current through the magnet 58.

The invention is not restricted to the illustrative embodiment described above and shown in the drawings, and many modifications are conceivable within the scope of the following Patent Claims. Thus, it is conceivable to replace the system of pivoting levers for operating the plunger 39 simply by a large solenoid, although in many cases its size would prove impractical. It is also conceivable to utilize a different type of cam for the microswitch 22 or the support 50. Also conceivable are other types of camera, in which the tensioning shaft requires to be rotated through only part of a single revolution in order to tension the camera. Several recesses 15 and 24 will, of course, be required for this purpose. It is also possible to conceive optical sensing of the angular positions, and the use of electronic circuit-breakers and change-over switches. A further possibility involves providing the winder with an external switch in place of the switch 29, which is actuated as the winder is attached. It is also appropriate for the connecting crown to be capable of being connected to the winding shaft in an asymmetrical or in some other way obvious fashion. It is also conceivable to connect a series resistance and a switch into the circuit for the purpose of zeroing the index marks when the winder is removed.

We claim:

1. A winding device for tensioning a camera, said camera having a winding shaft and a locking device for arresting the shaft when a tensioning motion of the same is finished until an exposure sequence of the camera is completed said winding device comprising an electric motor, a transmission device comprising a primary driving shaft in driving connection with the motor, a secondary drive shaft in driving connection with said winding shaft of the camera, a spung means connecting the primary drive shaft and the secondary drive shaft, said sprung means having a tightened position in which the secondary drive shaft is biased by the sprung means, a power supply, a first switch having a closed position to connect the motor with said power supply and an open position to interrupt the power supply, switch actuating means connected to the secondary drive shaft for opening the first switch when the secondary drive shaft is in a certain angular position corresponding to a position of the winding shaft of the camera in which the camera is tensioned and the shaft arrested, at least one locking notch on the primary drive shaft, a locking means for interacting with the locking notch to arrest the primary drive shaft in at least one certain angular position against motion under the influence of a reactive turning movement from the sprung means when biasing the secondary drive shaft, and said sprung means being dimensioned to store energy sufficient for the tensioning of the winding shaft of the camera with a sufficient turning movement when the secondary drive shaft is in its certain angular position and the primary drive shaft is in its certain angular position with the sprung means being tightened, so that the sprung means by releasing the winding shaft by means of the locking device tensions the camera by rotating the secondary drive shaft bringing it out of its certain angular position, thereby closing the first switch and actuating the motor to tighten the sprung means once again.

2. A winding device according to claim 1, wherein the switch actuating means connected to the secondary drive shaft is a single one and the locking notch on the primary drive shaft is a single one, thereby giving said shafts one certain angular position respectively per revolution.

3. A winding device according to claim 1, wherein said first switch in its open position holds a first circuit for the power supply to the motor open, said first switch closing another circuit, and there is provided a second switch to open and close said other circuit, said second switch being connected to the locking means of the primary drive shaft to be in a closed position in which the other circuit supplies power to the motor until the locking means is in a locking position and in said locking notch.

* * * * *